United States Patent

[11] 3,601,323

| [72] | Inventor | Donald P. Giencke |
| | | Milwaukee, Wis. |
| [21] | Appl. No. | 884,148 |
| [22] | Filed | Dec. 11, 1969 |
| [45] | Patented | Aug. 24, 1971 |
| [73] | Assignee | Allis-Chalmers Manufacturing Company |
| | | Milwaukee, Wis. |

[54] FILLER MATERIAL FOR GRINDING MILLS AND THE LIKE
4 Claims, 3 Drawing Figs.

[52] U.S. Cl.................................................. 241/70,
241/153, 241/171, 241/179
[51] Int. Cl..................................................... B02c 17/06
[50] Field of Search........................................... 241/70, 71,
72, 153, 179, 180, 181, 182, 183, 291, 294, 300

[56] References Cited
UNITED STATES PATENTS

| 1,440,002 | 12/1922 | Bradley | 241/45 |
| 2,456,073 | 12/1948 | Nowhouse | 241/180 X |
| 2,970,775 | 2/1961 | Chapman | 241/300 X |
| 2,970,783 | 2/1961 | Cheyette | 241/300 |
| 3,144,212 | 8/1964 | Klovers | 241/72 X |
| 3,298,619 | 1/1967 | Verch | 241/179 |

*Primary Examiner*—Granville Y. Custer, Jr.
*Attorneys*—Arthur M. Streich, Robert B. Benson and John P. Hines ABSTRACT: A grinding mill is disclosed having a cylindrical shell and a division head that divides the interior of the shell into axially disposed compartments. The division head is an assembly of elements and filler material, with at least a pair of the elements being spaced apart and the filler material therebetween. The filler material comprises hardened epoxy resin containing a dispersement of glass fibers in an amount of between about 0.4 to 0.7 grams per cubic inch of epoxy resin. The glass fibers are preferably at least about one-fourth inch long and may be up to three inches in length, although a maximum length of one-half inch is preferred. The material may also include about 0.6 to 1.0 cubic inches of silica sand per cubic inch of epoxy resin.

PATENTED AUG24 1971 3,601,323

Inventor
Donald P. Diencke
By Arthur M. Streich
Attorney

FILLER MATERIAL FOR GRINDING MILLS AND THE LIKE

CROSS REFERENCE TO RELATED PATENT APPLICATION

This invention is disclosed and described and is applied to grinding mills having division heads of two types. The mill having a division head of one type, as disclosed in FIGS. 1 and 2 of the drawings, is the subject of a patent application of Raymond C. Jenness and Wayne C. Dannenbrink, Ser. No. 884,059, filed Jan. 26, 1970.

BACKGROUND OF THE INVENTION

1. Field of the Invention

This invention relates to cylindrical grinding mills having a cylindrical shell and a division head assembly dividing the shell into compartments disposed along the central axis of the shell, and in particular to a filler material for filling spaces such as are provided between elements of the division head assembly, to prevent the elements from becoming loose during operation of the mill.

2. Description of the Prior Art

U.S. Pat. Nos. 2,970,775 and 2,970,783 granted Feb. 7, 1961 disclose utilizing epoxy resins as a cushioning filler and backing material in certain types of comminuting machinery, and in particular cone-type crushers. U.S. Pat. No. 2,970,783, which is the earliest in terms of its date of application, discloses the utility of epoxy resins especially where it can be poured. This first to be applied for patent speaks of fillers to reduce fluidity of epoxy for such use, but nevertheless later warns that when pouring epoxy into such a cavity that sealing of the lower end of the cavity is important because the hot plastic (and it is hot because of the chemical reaction with an activator) is highly fluid and will seek out the smallest crack or opening.

U.S. Pat. No. 2,970,775 which resulted from a later filed application speaks of many fillers, including fillers for the desired purpose to reduce the rate of flow and leaks, but nevertheless teaches that sealing means generally must be provided and discloses and claims such means.

Thus the aforementioned prior art is not specifically directed to the particular area in described field of the present invention, wherein sealing means would be most inconvenient and usually impossible to provide. Whereas the aforementioned prior art is directed to a filler for pouring and downward flow into top-open and bottom-closed cavities, the present invention, as will be described, is directed to a filler that can be forced horizontally and upwardly into upwardly extending and even vertically extending cavities without running back out of such cavities before the resin can take on a set, and will retain its desired set characteristics at temperature levels the filler will be exposed to during mill operation. Achieving the foregoing characteristics therefore represent objects of the present invention which will now be described.

SUMMARY OF THE PRESENT INVENTION

According to a preferred embodiment of the present invention a grinding mill having axially disposed compartments separated by a division head assembly of at least a pair of spaced elements, is provided with a filler material occupying space such as the space between the pair of elements. The filler material comprises epoxy resin with the necessary activator to cause it to set, and about 0.4 to 0.7 grams of glass fibers per cubic inch of the epoxy. In a most preferred form the filler contains glass fibers between one-quarter inch and one-half inch in length and between about 0.6 to 1.0 cubic inches of silica sand per cubic inch of epoxy. This filler when applied and before setting is thick enough to remain in place in vertically extending cavities until it does set; this filler is nevertheless then thin enough to be applied with such as a caulking gun without plugging the nozzle of a caulking gun, and after setting this filler retains the qualities of strength, adhesion and resistance to thermal deformation, needed to withstand operation of a grinding mill and prevent adjacent parts of the assembly becoming loose.

Other features and objects of the invention that have been attained will appear from the more detailed description to follow with reference to an embodiment of the present invention shown in the accompanying drawing.

DESCRIPTION OF THE PREFERRED EMBODIMENT

Figures 1, 2, 3:
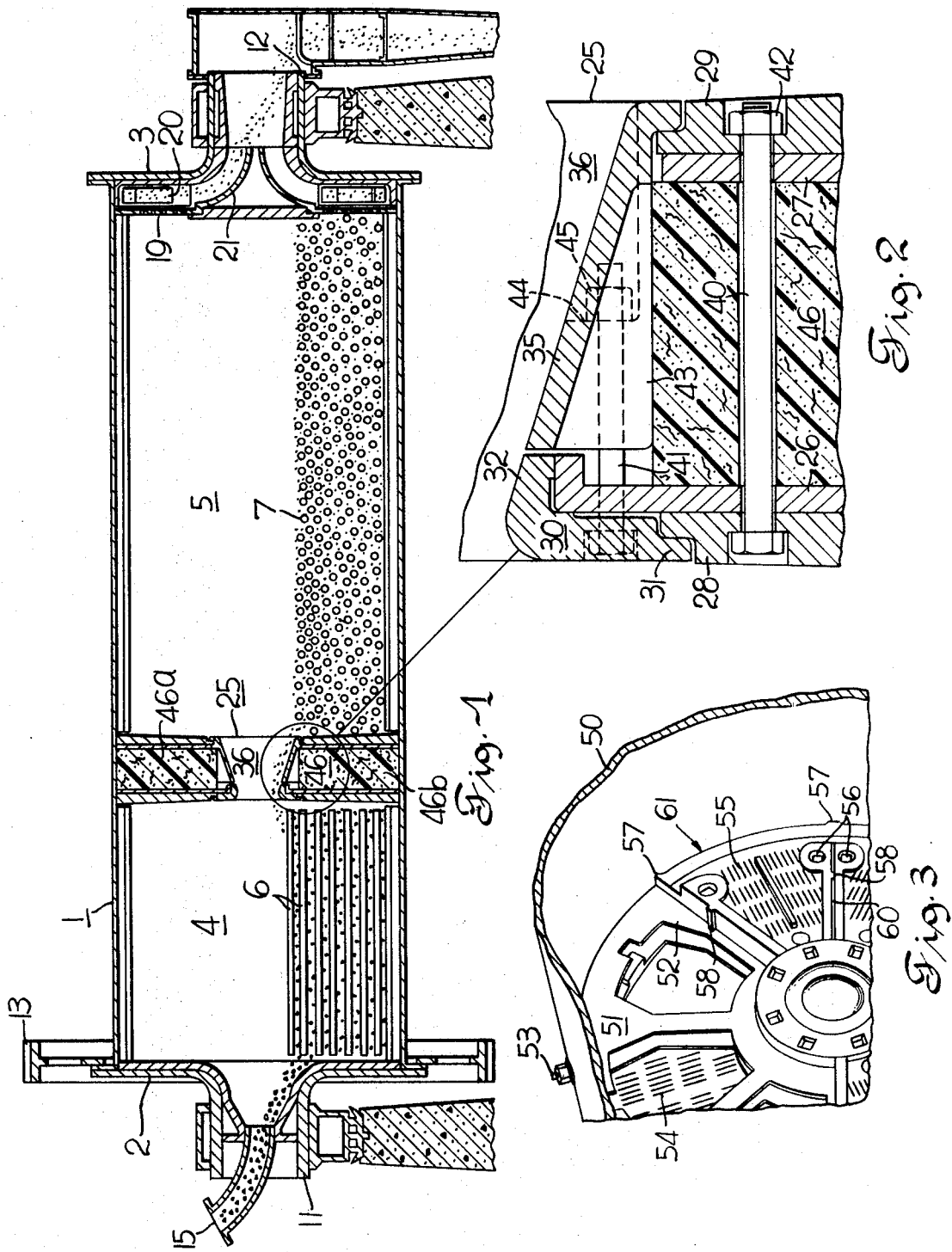
FIG. 1 of the accompanying drawing shows a side elevation, in section, a grinding mill to which the present invention may be applied.
FIG. 2 shows to enlarged scale, a portion of a division head assembly in FIG. 1.
FIG. 3 is a fragmentary view of a grinding mill having a division head of another type to which the present invention may be applied.

The multistage grinding mill disclosed in FIG. 1 of the drawing comprises in general a rotary cylindrical casing 1 illustrated as having uniform or substantially uniform diameter throughout its length, the casing being provided with feed and discharge end heads 2, 3, respectively. The casing 1 is divided into a pair of grinding chambers 4 and 5 in a manner and by structure that will be described in detail later. The chamber 4 on the inlet end of the casing 1 is provided with a plurality of rods 6 that provide for relatively coarse grinding in the chamber 4. The chamber 5 is provided with a plurality of balls 7 for relatively fine grinding of material in the chamber 5. The mill is rotatably mounted in suitable end bearings which carry feed and discharge trunnions 11 and 12, respectively. Rotary motion about its horizontal central axis is imparted to the mill by means of power applied to a driving gear 13 secured either around the inlet end of the casing 1 as shown or around the feed trunnion (not shown). The feed end of the mill is provided with a feeder 15 for introducing the material which is to be reduced in size, into the inlet end of the coarse grinding chamber 4 through the feed trunnion 11.

The discharge end of chamber 5 is provided with a perforated plate 19 which is spaced from the end head 3. Located within the space between plate 19 and the end head 3 is a series of elevating vanes 20. The inner extremities of the elevating vanes 20 are located close to a central discharge cone 21, the apex of which is directed toward the discharge trunnion 12.

The arrangement shown in FIGS. 1 and 2 for dividing the casing 1 into the two grinding compartments 4 and 5, includes an arrangement of parts described and claimed in the copending patent application of Raymond C. Jenness and Wayne C. Dannenbrink, before mentioned, and to which the present invention is applied. A division head assembly 25 is mounted within the mill and as shown to enlarged scale in FIG. 2 comprises a pair of spaced annular bulkheads 26, 27. The side of bulkhead 26 facing the feed head 2 and the side of bulkhead 27 facing the discharge head 3, are each provided with replaceable wear liners 28, 29 respectively. Liner 29 projects farther radially inward than does bulkhead 27 but the reverse is true on the opposite side of the division head assembly where the liner 28 does not project as far as radially as bulkhead 26 thus leaving an inner portion of bulkhead 26 unprotected by liner 28. The inner portion of bulkhead 26 not protected by liner 28 is however covered and protected by a liner 30 having both a radial portion 31 and an axially extending portion 32. A liner 35 extends between the axial extending portion 32 of liner 30 and the radially inner portion of liner 29, and portion 32 and liner 35 together provide and define a central opening 36 through the division head assembly 25 having a surface with the configuration of a truncated cone with its apex end pointed toward the feedhead 2 end of the mill. The aforesaid elements of the division head assembly 25 are held together by bolts 40, 41. Bolt 40 passes through liner 28, bulkheads 26, 27 and liner 29 where a nut 42 is secured thereto. Bolt 41 passes through the radial portion 31 of liner 30, bulkhead 26 and a radially outward portion 43 of the liner 35. The portion 43 is provided with a radial surface 44 and a nut 45 on bolt 41 is turned to bear against the surface 44.

The space 46 between bulkheads 26, 27 and enclosed by liner 35, is filled with the special filler material of this invention. As previously stated, the filler material most preferred comprises epoxy resin, activator, glass fibers and silica sand. The activator may be any one of a number of known curing agents such as diethylene triamine, diethylamino propylamine, amine-resin and amine-glycidyl adducts, amine-ethylene oxide adducts, various amine blends, cyclic aliphatic amines, and organic acids and various acid anhydrides. About 0.06 cubic inch of activator is required per cubic inch of epoxy resin. The glass fibers are most preferably one-fourth inch to one-half inch in length. Fibers up to 3 inches in length have been tested successfully but tend to clog and plug the nozzle of a caulking gun used to apply the filler. The glass fibers should be in an amount of about 0.4 to 0.7 grams per cubic inch of epoxy. The glass fibers of the most preferred length may be produced by cutting glass cloth or threads available commercially and identified by the trademark "Fiberglas," or a quantity of the epoxy may be mixed with activator, permitted to set, and then chopped or shreaded to provide fibers of the desired size, i.e., one-fourth to one-half inch in length and a diameter or maximum cross section dimension of some lesser measurement (which has been determined to be not critical). It is also preferred, as previously stated, to utilize about 0.6 to 1.0 cubic inches of silica sand per cubic inch of epoxy.

Referring to FIG. 3, a division head assembly is shown that has used extensively and to which the present invention can be applied, as will now be described. In FIG. 3 a rotary cylindrical mill shell 50 is provided with a division head assembly 51 which is shown as viewed from the feed end of the mill looking toward the discharge end. The assembly 51 includes a spider 52 secured to the inner surface of the mill shell 50 by bolts 53 projecting radially therethrough. Discharge grates 54 are bolted to the discharge side of spider 52 and feed side grates 55 are secured by bolts 56 to the feed side of the spider. Radially projecting lugs 57 and lugs 58 that project transversely to lugs 57, are provided on each grate, as shown on the near side grate 55. Thus, in this assembly adjacent grates 55 are elements of the assembly that are spaced apart (by the lugs 58) and this space 60 as well as a space 61 between lugs 57 and the mill shell 50, are spaces that are filled with the filler material that has been described.

With the filler material that has been described, the spaces 60 and 61 in FIG. 3 can be filled using a caulking gun and the filler remains in place without seals or the like and the filler sets to bond the assembly into a unitary structure that does not loosen during mill operation at elevated temperatures. Likewise in FIG. 1, the upper portion 46a as well as the lower portion 46b of the space 46 can be filled with the described filler, which remains in place to set and bond together an assembly as shown in FIGS. 1 and 2, that will not loosen during mill operation at elevated temperatures.

From the foregoing detailed description of the present invention, it has been shown how the objects of the invention have been attained in a preferred manner. However, modifications and equivalents of the disclosed concepts such as readily occur to those skilled in the art are intended to be included within the scope of this invention.

The embodiments of the invention in which an exclusive property or privilege I claim is defined as follows:

1. In cylindrical grinding mills and the like having axially disposed compartments separated by a division head assembly of elements and filler material, with at least a pair of the elements being spaced apart with the filler material therebetween, said filler material comprising hardened epoxy resin containing a dispersement of glass fibers in an amount between about 0.4 to 0.7 grams per cubic inch of the epoxy resin.

2. The structure of claim 1 characterized in that the glass fibers are about one-fourth inch and 3 inches in length.

3. The structure of claim 1 characterized in that the glass fibers are between about one-fourth inch and one-half inch in length.

4. The structure of claim 1 characterized in that the filler material includes about 0.6 to 1.0 inches of silica sand per cubic inch of epoxy resin.